358-190. OR 3,814,851 SR

United States Patent [19]
Nakagawa et al.

[11] 3,814,851
[45] June 4, 1974

[54] LOW VOLTAGE D.C. SUPPLY CIRCUIT

[75] Inventors: Yutaka Nakagawa; Masao Suzuki, both of Tokyo, Japan

[73] Assignee: Sony Corporation, Tokyo, Japan

[22] Filed: July 28, 1972

[21] Appl. No.: 275,950

[30] Foreign Application Priority Data

Aug. 13, 1971 Japan .............................. 46-72466

[52] U.S. Cl. ........................ 178/7.3 R, 178/DIG. 11
[51] Int. Cl. ............................................ H04n 5/44
[58] Field of Search....... 178/DIG. 11, 7.3 R; 321/2, 321/2 HF

[56] References Cited

UNITED STATES PATENTS

| | | | |
|---|---|---|---|
| 3,376,489 | 4/1968 | Crayton | 321/2 |
| 3,541,420 | 11/1970 | Rees | 321/2 |
| 3,621,134 | 11/1971 | Waring | 178/DIG. 11 |
| 3,708,741 | 1/1973 | Hekimian | 321/2 |

*Primary Examiner*—Richard Murray
*Attorney, Agent, or Firm*—Lewis H. Eslinger; Alvin Sinderbrand, Esq.

[57] ABSTRACT

A low voltage D.C. supply circuit for use in a transistorized television receiver in which a high frequency alternating signal from an extra winding in the horizontal output or flyback transformer is rectified to supply a low voltage D.C. current to the horizontal oscillator and automatic synchronization circuits. In order to cause the horizontal oscillator to begin oscillations an initial pulse is taken from the transformerless main power supply of the television receiver and is rectified and supplied to the horizontal oscillator.

5 Claims, 4 Drawing Figures

T5117
R

LOW VOLTAGE D.C. SUPPLY CIRCUIT

BACKGROUND OF THE INVENTION

The present invention relates to low voltage D.C. supply circuits for use in television receivers having transformerless power supplies and to television camera circuits.

In a transistorized television receiver circuit several different direct current voltage levels are required. One such direct current voltage level is at a relatively low voltage, for example 18 volts, which is used for the tuner circuit, the video I.F. amplifier, the audio I.F. amplifier, the vertical and horizontal deflection circuits, the sync separator, and the like. In the case of a portable television receiver of the type having a transformerless, main power supply it is desirable to obtain such a low voltage D.C. current without the necessity of using a dropping resistor from a larger level D.C. source. The use of such dropping resistors dissipates power in the form of heat and this result is undesirable in a transistorized television receiver.

It has been suggested that an alternating current signal derived from an extra winding on the flyback transformer (FBT) in the horizontal output circuit be rectified and used as a low voltage direct current supply for the low voltage circuits. One disadvantage of such a proposal is that until the horizontal oscillator circuit begins oscillation there is no low voltage alternating current to be derived from the flyback transformer. Thus an initial pulse of current is necessary to start the oscillator circuit which then causes the horizontal output circuit to generate the alternating current in the extra winding in the flyback transformer.

In some low voltage D.C. circuits of this type a condenser voltage divider network, sometimes referrred to as a "kick" circuit, derives a surge voltage from the common power supply of the television receiver. The surge voltage need only be applied to the horizontal oscillator to cause it to begin oscillations and thereafter the rectified voltage derived from the flyback transformer can supply the necessary operating voltage for the horizontal oscillator.

Initially the surge voltage from the power supply has a high ripple component. This alternating current or ripple component causes an instability in the horizontal oscillator with the result that when the television viewer first turns on the television set the observed picture is scrambled for a predetermined length of time until the horizontal oscillator is stabilized by means of its own self-generated D.C. power supply. However, if the horizontal oscillator continues to be connected to the main power supply by the condenser, ripple voltage can still be applied to the horizontal oscillator and can scramble the picture even after the need for a surge voltage to initiate operation of the horizontal oscillator has ended.

Still another problem of such prior art kick circuits is that the condenser through which the surge voltage is applied to initiate operation of the horizontal oscillator remains charged for a relatively long time after the receiver has been turned off. Thus, if the viewer turns off the television receiver and then wishes to turn it back on, he cannot turn the receiver back on immediately but must wait for the condenser to discharge before the surge voltage will be supplied to the horizontal oscillator.

SUMMARY OF THE INVENTION

The present invention comprises a low voltage, direct current supply circuit for use in a television receiver of the type having a circuit ground and a transformerless main power supply, the low voltage supply comprising a transformer having a primary coil and at least one secondary coil, means connected to the primary coil for generating an alternating current in the secondary coil, means connected to the secondary coil for converting the alternating current into direct current and for supplying the direct current to the means for generating the alternating current, and means connected to the main power supply for supplying an initial pulse of current to the means for generating the alternating current. The initial pulse supplying means has a series circuit connected across the output of the power supply. The series circuit includes a first condenser, a second condenser connected by one lead to the circuit ground, and a first diode having at least two terminals. The first diode is connected in series between the first and second condensers with the initial pulse being derived at one of the diode terminals.

In one embodiment an additional diode is connected between the circuit ground and the series connection of the first diode and the first condenser. The polarity of the second diode is oriented so as to discharge the first condenser through the means for generating the alternating current when the television receiver is turned off. The purpose of this second diode is to allow the initial pulse generating means or kick circuit to be immediately operative in the situation where the television receiver is first turned off and then immediately turned back on.

It is therefore an object of the invention to provide a stabilized low voltage direct current supply for a portable transistorized television set which is operative the moment the television set is turned on.

It is still another object of the invention to provide a low voltage D.C. supply for the horizontal oscillator circuit of a transistorized television set which eliminates any ripple signal when the television set is first turned on.

It is a still further object of the invention to provide such a low voltage direct current supply for the horizontal oscillator circuit of a transistorized television which maintains its stability when the television set is rapidly turned off and then turned on again.

The foregoing and other objectives, features, and advantages of the invention will be more readily understood upon consideration of the following detailed description of certain preferred embodiments of the invention, taken in conjunction with the accompanying drawings.

BRIEF DESCRIPTION OF THE DRAWINGS

FIG. 3 is a detailed schematic diagram of a portion of a television receiver employing the embodiment of FIG. 2;

DESCRIPTION OF CERTAIN PREFERRED EMBODIMENTS

Figure 1:
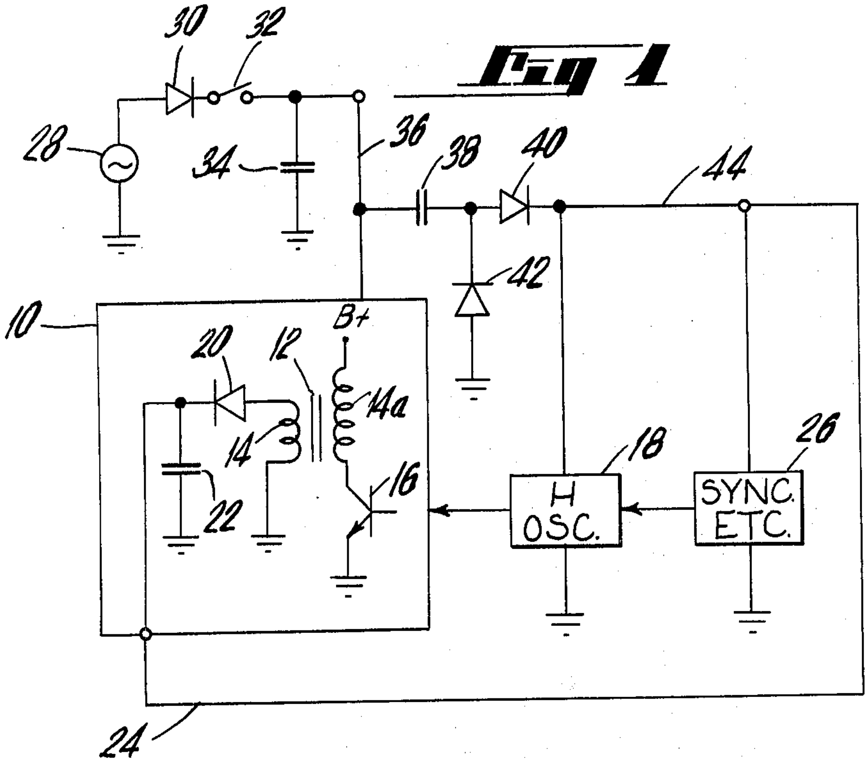
FIG. 1 is an illustrative schematic diagram of a portion of the horizontal output circuit of a television receiver employing a first embodiment of the invention.
Figure 2:
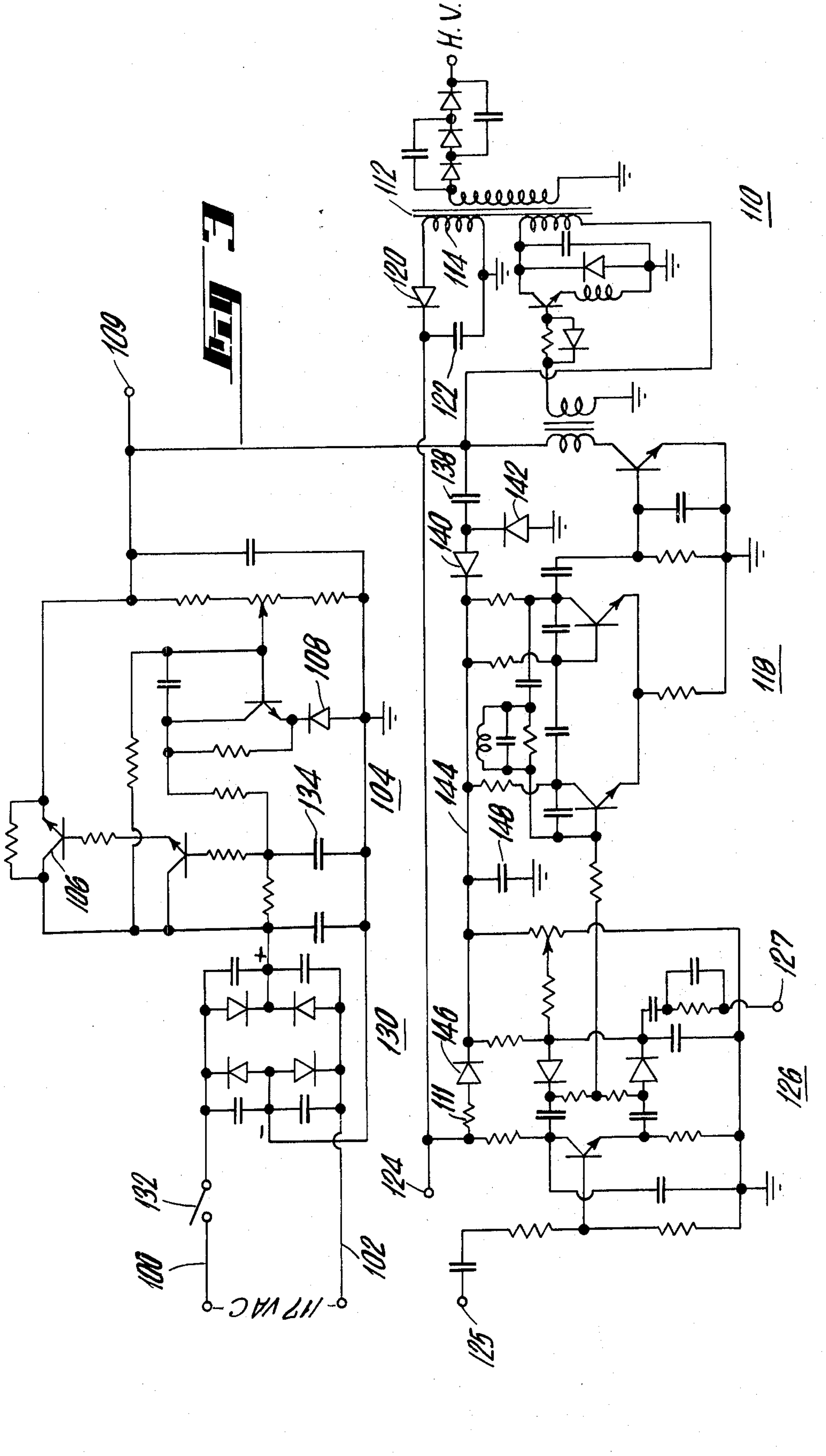

Referring now more particularly to FIG. 1 a portion of a horizontal output circuit 10 is shown as comprising a flyback transformer 12 having a primary winding 14*a* and an auxiliary winding 14. One end of the primary winding 14*a* is connected to the B+ supply of the television receiver and the other end of the winding 14*a* is connected through an output transistor 16 to the circuit ground. The input to the horizontal output circuit 10 is supplied from a horizontal oscillator generally designated as 18. One lead of the winding 14 is connected to the circuit ground and the other lead is connected to the anode terminal of a diode 20.

The cathode terminal of the diode 20 is connected to one lead of a condenser 22 and to a supply lead 24. The other lead of the condenser 22 is connected to the circuit ground. The supply lead 24 is connected to supply low voltage direct current rectified by the diode 20 to a synchronous detector circuit 26 and to the horizontal oscillator circuit 18. As long as the horizontal oscillator circuit is supplying an alternating current output to the input of the circuit 10 an alternating current is generated in the flyback transformer 12 and the winding 14. The alternating current appearing at the winding 14 is rectified by the diode 20 and is filtered by the condenser 22. The low voltage direct current is then used to power the synchronizing circuits 26 and the horizontal oscillator 18.

Without a D.C. voltage applied to lead 24, however, the horizontal oscillator will not operate and therefore it is necessary to supply an initial pulse of direct current to the horizontal oscillator to begin the operation. This initial pulse of current is derived from the main power supply of the transistorized television receiver. As is diagrammatically illustrated in FIG. 1 an alternating current source 28, such as the standard 117 V.A.C. line source, is rectified by a diode 30 having its anode terminal connected to the grounded alternating current source 28. The cathode terminal of the diode 30 is connected through an on-off switch 32 to a first lead of a filter condenser 34. The other lead of the condenser 34 is connected to the circuit ground. The first lead of the condenser 34 is connected by a line 36 to power the horizontal output circuit 10 and is also connected to one lead of a condenser 38.

The other lead of the condenser 38 is connected to the anode terminal of a diode 40 and to the cathode terminal of a diode 42. The anode terminal of the diode 42 is connected to the circuit ground and the cathode terminal of the diode 40 is connected to a bias line 44. The bias line 44 is connected to supply the voltage output from the cathode terminal of the diode 40 to the horizontal oscillator 18 and the synchronizing circuit 26. The lead 44 is also connected to the lead 24.

In operation, when the switch 32 is closed a surge of direct current is applied through the condenser 38 and the diode 40 to the horizontal oscillator 18 to start it oscillating and supplying an alternating signal to the input of the horizontal output circuit 10. Thereafter the alternating current rectified by the diode 20 from the winding 14 continues to supply the horizontal oscillator 18. The diode 40 affectively blocks any ripple signal from interfering with the operation of horizontal oscillator 18, because the diode 40 can conduct current only when its anode is positive with respect to its cathode. This is true during the initial surge when the receiver is first turned on, but is no longer true after the horizontal output circuit 10 begins to supply direct voltage by way of the line 24.

When the switch 32 is opened to turn off the television receiver the capacitor 38 is discharged immediately through the horizontal output circuit 10 and the diode 42 so that the initial pulse supplying circuit comprised of the condenser 38, the diode 40 and the condenser 22 is ready to supply another initial pulse when the television receiver is turned on again by the closing of the switch 32.

Figure 2:
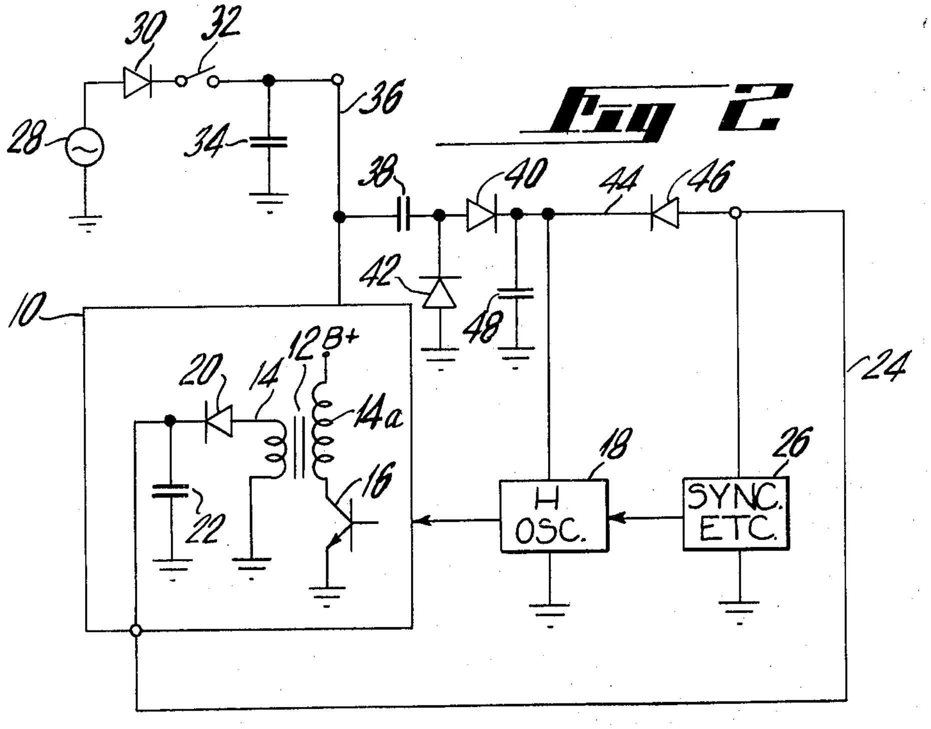
FIG. 2 is an illustrative schematic diagram of a portion of a television receiver employing a second embodiment of the invention.

Referring now to FIG. 2, in a modification of the embodiment of FIG. 1 a diode 46 is connected by its cathode terminal to the lead 44 and by its anode terminal to the synchronizing circuit 26 and the lead 24. A second filter condenser 48 is connected by one of its leads to the lead 44 and by its other lead to the circuit ground. The diode 46 serves to block the initial pulse of current from reaching any circuit other than the horizontal oscillator 18 when the switch 32 is first closed. The condenser 48 then acts as the ripple filter in place of the condenser 22.

Referring now to FIG. 3 a portion of a television receiver in which the embodiment of FIG. 2 is employed is illustrated. A standard 117 V.A.C. source supplies alternating current to the leads 100 and 102. A switch 132 in the lead 100 controls the flow of alternating current to a full wave rectifier circuit 130 connected between the switch 132 and the lead 102. The reference numerals in this embodiment correspond whenever possible to the reference numerals of similar components in the embodiments described in reference to FIGS. 1 and 2. Thus the switch 132 corresponds to the switch 32 in the embodiment of FIGS. 1 and 2. The positive terminal of the rectifying bridge 130 is connected to a conventional voltage regulating circuit 104. This circuit 104 will not be described in detail since its operation is well known in the art.

The voltage regulating circuit 104 includes a voltage regulating transistor 106 and a zener diode 108 to control the voltage level at an output lead 109. The negative terminal of the rectifying bridge 130 is connected to the circuit ground. The voltage regulating circuit 104 is also connected to the circuit ground. A filtering capacitor 134 is included in the voltage regulating circuit and this filtering capacitor corresponds to the filtering capacitor 34 in the embodiment of FIGS. 1 and 2.

The output lead 109 is connected to the remaining circuits of the television receiver (not shown) such as the audio amplifier, the vertical amplifier and the vertical output circuits, for example.

The lead 109 is also connected to supply direct current to the horizontal output circuit 110 and the horizontal oscillator circuit 118, corresponding respectively to the horizontal output circuit 10 and the horizontal oscillator 18 in the embodiment of FIG. 2. The horizontal output circuit 110 includes a flyback transformer 112 having an auxiliary winding 114. One lead of the winding 114 is connected to the circuit ground and the other lead is connected to the anode terminal of a diode 120 whose cathode terminal is connected through a filtering capacitor 122 to the circuit ground.

The cathode terminal of the diode 120 is also connected to a lead 124 which supplies low voltage, direct current to the remaining transistor circuits within the television receiver which require such a low voltage, direct current supply. One such circuit is the automatic frequency control and synchronizing circuit 126 corresponding to the synchronizing circuit 26 of the embodiment of FIG. 2. The input 125 of the circuit 126 is supplied with horizontal synchronizing pulses from a synchronous separator circuit, not shown. The circuit 126 is also supplied with a sawtooth shaped signal from the flyback transformer 112 at lead 127.

The anode of a diode 146 is connected through a resistor 111 to the lead 124. The cathode of the diode 146 is connected to the circuit 126 and to a lead 144. A filtering capacitor 148 is connected between the lead 144 and the circuit ground. The lead 144 is connected to the power supply terminal of the horizontal oscillator 118 and to the cathode terminal of a diode 140.

The anode terminal of the diode 140 is connected to the cathode terminal of a diode 142 and to one lead of a condenser 138. The anode terminal of the diode 142 is connected to the circuit ground and the other lead of the condenser 138 is connected to the lead 109. The circuit comprised of elements 138, 140, 142, 144, 148 and 146 corresponds to the initial pulse supplying circuit comprised of elements 38, 40, 42, 44, 48 and 46, respectively, in the embodiment of FIG. 2. This circuit operates in substantially the same manner as the embodiment described with reference to FIG. 2.

Figure 4:
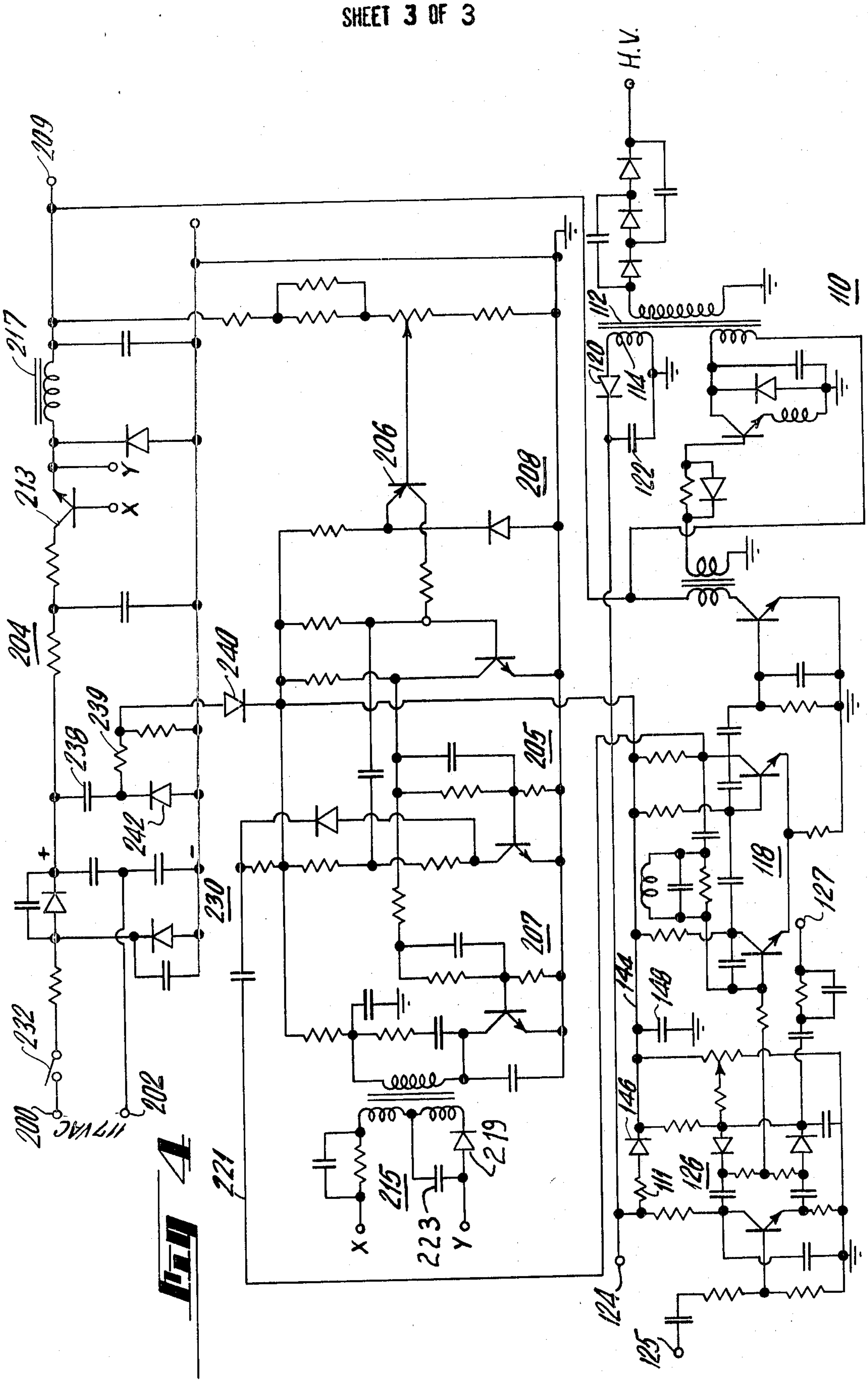
FIG. 4 is a schematic diagram of still another embodiment of the invention as used in a television receiver circuit.

Referring now more particularly to FIG. 4, in still another embodiment of the invention alternating current from a standard 117 V.A.C. source is applied to two power leads 200 and 202. The lead 200 is connected through an on-off switch 232 to one terminal of a conventional voltage doubler rectifier circuit 230. The other lead 202 is connected to the other terminal of the circuit 230. The positive output lead of the circuit 230 is connected to one lead of a voltage regulating circuit 204 which includes an error amplifier transistor 206, an error voltage detecting circuit 208, a one shot multivibrator 205, a pulse drive circuit 207, a chopping transistor 213 and a pulse rectifier circuit 215.

A condenser 238 is connected by one lead to the positive output terminal of the voltage doubler rectifier circuit 230 and to the cathode of a diode 242. The anode of the diode 242 is connected to the circuit ground. The cathode of the diode 242 is also connected through a resistor 239 to the anode of a diode 240. The cathode of the diode 240 is connected to the lead 144 which supplies the low voltage direct current to the horizontal oscillator circuit 118. The remainder of the circuit with respect to the synchronizing circuit 126, the horizontal output circuit 110, and the horizontal oscillator circuit 118 is substantially the same as was described with reference to the embodiment of FIG. 3 and similar corresponding reference numerals have been given to the elements shown in FIG. 4. Together the elements 238, 242, 240, 148 and 146 comprise the initial pulse supplying circuit to start the oscillator 118 when the television receiver is first switched on by the closing of the switch 232.

The voltage regulating circuit of this embodiment also requires a "kick" pulse to begin its initial operation. It operates generally in the following manner. The one shot multivibrator circuit 205 produces pulses having a certain width in response to positive trigger pulses from the horizontal oscillator circuit which are supplied to the multivibrator circuit through a lead 221. The pulses having a certain width from the multivibrator circuit are fed through the drive circuit 207 and the pulse rectifier circuit 215 to a pair of terminals X and Y which are respectively connected to the base and emitter electrodes of the chopping transistor 213.

By means of the error amplifier transistor 206 in the error detecting circuit 208, any deviation in the voltage output from the regulating circuit 204 at the terminal 209 is sensed and the error detecting circuit 208 produces a change in width of the pulses from the multivibrator circuit 205. Thus the width of the pulses from the multivibrator circuit 205 is representative of the deviation in the voltage output of the voltage regulating circuit 204. By controlling the width of the pulses fed to the base electrode of the chopping transistor 213, the conduction of the chopping transistor can be controlled with a consequent control of the D.C. voltage level at the terminal 209.

As in the case of the other low voltage circuits 118 and 126, the one shot multivibrator circuit 205 is powered by means of the rectified current taken from the winding 114 of the flyback transformer 112. In order that the voltage regulating circuit will become operative when the television receiver is first turned on the initial pulse generating circuit also supplies an initial pulse to the one shot multivibrator 205. The cathode of the diode 240 is connected to the one shot multivibrator and the error detecting circuit 208 for this purpose.

A choke coil 217 in series between the emitter of the chopping transistor 213 and the output terminal 209 filters out the ripple in the voltage output when the chopping transistor 213 is non-conducting. A rectifier 219 in the pulse rectifier circuit 215 is connected by its anode to the emitter of the transistor 213 and by its cathode, through the circuit 215, to the base of the transistor 213. A condenser 223 connected effectively in parallel with the rectifier 219 is charged by it. Together the rectifier 219 and the condenser 223 serve to cause the chopping transistor 213 to remain conductive for a moment after the stopping of the one shot multivibrator 205 when the television receiver is turned off. This allows the condenser 238 to be discharged through the horizontal output circuit 110, the diode 242 and the transistor 213 so that the initial pulse generating circuit will be immediately operable when the television receiver is turned on again.

The terms and expressions which have been employed here are used as terms of description and not of limitation, and there is no intention in the use of such terms and expressions, of excluding equivalents of the features shown and described, or portions thereof, it being recognized that various modifications are possible within the scope of the invention claimed.

What is claimed is:

1. A television receiver comprising:

A. a main power supply;

B. a low voltage direct current supply circuit connected to said main power supply to receive power therefrom and comprising:

1. a transformer comprising a primary winding and a secondary winding, 2. switching means connected to said primary winding to generate an alternating current in said secondary winding, and
3. rectifying means connected to said secondary winding to convert said alternating current to direct current;

C. driving means connected to said switching means to supply an actuating signal thereto;

D. a power connecting circuit connecting said rectifying means to said driving means to supply operating power to said driving means after said alternating current begins to be generated in said secondary winding; and E. initial surge voltage supplying means connecting said main power supply to said driving means, said surge voltage supplying means comprising:
1. a capacitor and a first unidirectionally conductive device connected in series between said main power supply and said circuit, said unidirectionally conductive device being polarized to be conductive only when the voltage of said main power supply is higher than the voltage of said circuit, and
2. a discharge unidirectionally conductive device connected to said capacitor and polarized to be conductive to discharge said capacitor when said main power supply is turned off.

2. The television receiver of claim 1 in which said first unidirectionally conductive device is a first diode, said main power supply comprises a relatively high voltage terminal connected to said low voltage direct current supply circuit and a common terminal, said discharge unidirectionally conductive device is a second diode connected between said common terminal and the common junction of said capacitor and said first diode.

3. The television receiver of claim 1 in which said first unidirectionally conductive device comprises a first diode, said discharge unidirectionally conductive device comprises a second diode, and said rectifying means comprises a third diode and a second capacitor connected as a filter capacitor in series with said third diode and said secondary winding.

4. The television receiver of claim 3 in which said power connecting circuit comprises a fourth diode polarized to conduct current from said rectifying means to said driving means and said receiver comprises, in addition:

A. an additional circuit connected to said rectifying means to be operated by said direct current; and B. a second capacitor connected between said common terminal and the junction of said first and fourth diodes.

5. The television receiver of claim 1 in which said transformer is a flyback transformer and said driving means comprises a horizontal oscillator circuit.

* * * * *